(12) United States Patent
Pattok et al.

(10) Patent No.: US 6,564,125 B2
(45) Date of Patent: May 13, 2003

(54) METHOD FOR UPDATING A SENSOR USING A ROBUST SENSOR OFFSET LEARNING ALGORITHM

(75) Inventors: Kathryn Lynn Pattok, Saginaw, MI (US); Ashok Chandy, Fenton, MI (US); Mark Philip Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/940,111

(22) Filed: Aug. 27, 2001

(65) Prior Publication Data

US 2003/0040855 A1 Feb. 27, 2003

(51) Int. Cl.$^7$ .......................... G01M 17/00; G06F 7/00
(52) U.S. Cl. .......................... 701/29; 701/34; 701/35; 324/207.12; 73/489; 73/491; 702/94; 702/96; 702/104; 702/116
(58) Field of Search .......................... 701/29, 41, 36, 701/42, 1, 31, 34, 35; 180/443; 700/67, 68, 56, 64, 69; 73/116, 117.2, 117.3, 118.1, 480–491, 506–510, 527–528; 702/85, 94, 96, 116, 104, 142, 147, 148; 123/480; 324/207.25, 207.2, 202, 207.11, 207.12, 225

(56) References Cited

U.S. PATENT DOCUMENTS

| | | | | |
|---|---|---|---|---|
| 4,586,403 A | * | 5/1986 | Lee et al. | 123/480 |
| 5,056,360 A | * | 10/1991 | Dosdall et al. | 73/116 |
| 5,627,465 A | * | 5/1997 | Alfors et al. | 324/202 |
| 5,857,160 A | * | 1/1999 | Dickinson et al. | 180/446 |
| 5,948,030 A | | 9/1999 | Miller et al. | 701/41 |
| 6,039,144 A | * | 3/2000 | Chandy et al. | 180/446 |
| 6,314,329 B1 | * | 11/2001 | Madau et al. | 700/67 |

* cited by examiner

Primary Examiner—Jacques H. Louis-Jacques
(74) Attorney, Agent, or Firm—Edmund P. Anderson

(57) ABSTRACT

A method for updating a sensor offset and a medium encoded with a machine-readable computer program code for updating a sensor using a robust sensor learning algorithm wherein the method includes obtaining vehicle data signals, obtaining a position sensor data signal, the position sensor data signal being responsive to a stored positional offset data signal, determining whether algorithm initial conditions are satisfied, formulating a new positional offset data signal conditioned on satisfaction of the initial conditions, and storing said new positional offset data signal so as to combine said new positional offset data signal with said stored positional offset data signal and replace said stored positional offset data signal.

34 Claims, 2 Drawing Sheets

METHOD FOR UPDATING A SENSOR USING A ROBUST SENSOR OFFSET LEARNING ALGORITHM

BACKGROUND

Most vehicles that have electric power steering systems also employ position sensors to monitor and provide an active returnability capability. Thus, as a vehicle is being driven, an active return command may be generated and communicated to the electric power steering system. In fact, this active return command could be generated even while the vehicle was being driven in a straight direction. Unfortunately, if the position sensor developed an offset over time, this offset could accumulate and be reflected in the active return command. This could cause problems, such as component wear, wheel misalignment or steering pull. In order to reduce or prevent these problems from occurring, the vehicle could be brought into an automotive service center on a periodic basis where any accumulated position offset could be evaluated, and corrected if necessary, by a service technician.

One problem that exists with a service type of arrangement is that vehicle owners might have any accumulated offset corrected only after misalignment or component wear has occurred. Another problem that sometimes occurs is that, even though some vehicle owners have their vehicles serviced regularly, this positional offset may develop and accumulate during the times between their regular servicing. In general, it is desirable not to require periodic service for a system and in fact, this is often a requirement of the OEM.

In view of the above, it would be desirable to provide a method for monitoring and updating a position sensor over time.

BRIEF SUMMARY

A method for updating a sensor offset using a robust sensor learning algorithm wherein the method includes obtaining vehicle data signals; obtaining a position sensor data signal, the position sensor data signal being responsive to a stored positional offset data signal; determining whether algorithm initial conditions are satisfied; formulating a new positional offset data signal conditioned on satisfaction of the initial conditions; and storing the new positional offset data signal so as to combine the new positional offset data signal with the stored positional offset data signal and replace the stored positional offset data signal.

A medium encoded with a machine-readable computer program code for updating a sensor offset using a robust sensor offset learning algorithm, the medium including instructions for causing controller to implement the aforementioned method.

BRIEF DESCRIPTION OF THE DRAWINGS

The present invention will now be described, by way of an example, with references to the accompanying drawings, wherein like elements are numbered alike in the several figures in which.

DETAILED DESCRIPTION OF AN EXEMPLARY EMBODIMENT

An exemplary embodiment is described herein by way of illustration as may be applied to a vehicle and more specifically a vehicle which employs an electric power steering system. While a preferred embodiment is shown and described, it will be appreciated by those skilled in the art that the invention is not limited to the embodiment and application described herein, but also to any vehicle or device which employs an electric power steering system or any system which employs a sensor where an offset auto-correction is desired, such as a system which employs a torque sensor. Those skilled in the art will appreciate that a variety of potential implementations and configurations are possible within the scope of the disclosed embodiments.

Figure 1:
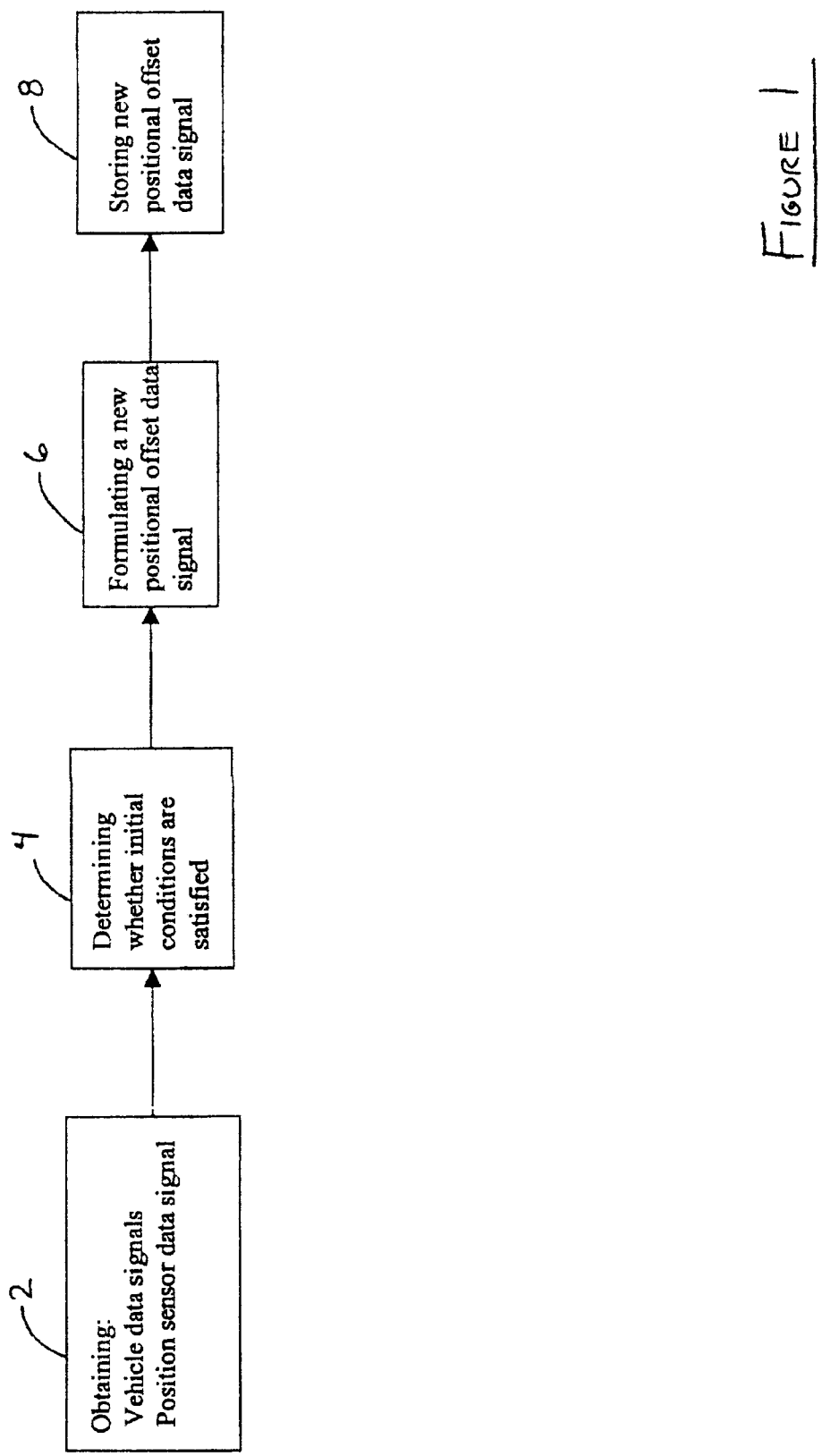
FIG. 1 illustrates a high level block diagram describing a robust sensor offset learning algorithm in accordance with an embodiment of the invention.

Referring to the drawings, FIG. 1 illustrates an overall block diagram describing a method for updating a position sensor using a robust sensor offset learning algorithm. In accordance with an embodiment of the invention once an ignition cycle is initiated at least one vehicle data signal is obtained from at least one vehicle data sensor and at least one position sensor data signal is obtained from at least one position sensor, as shown is step 2. In accordance with an embodiment of the invention the position sensor data signal is responsive to a previously stored positional offset data signal, a new positional offset data signal and the angular position of a vehicle steering wheel. It is then determined whether these signals are within predetermined initial condition constraints of the robust sensor offset learning algorithm as in step 4. Once it is determined that the vehicle data signal and the position sensor data signals satisfy the initial constraints of the robust sensor offset learning algorithm, a new positional offset data signal is formulated as in step 6. Once the ignition cycle has been terminated, the new positional offset data signal formulated as in step 6 is then combined with the previously stored positional offset data signal and stored into an erasable, writable non-volatile memory, such as EEPROM, so as to replace the previously stored positional offset data signal as in step 8. These steps are explained and expanded further below.

Figure 2:
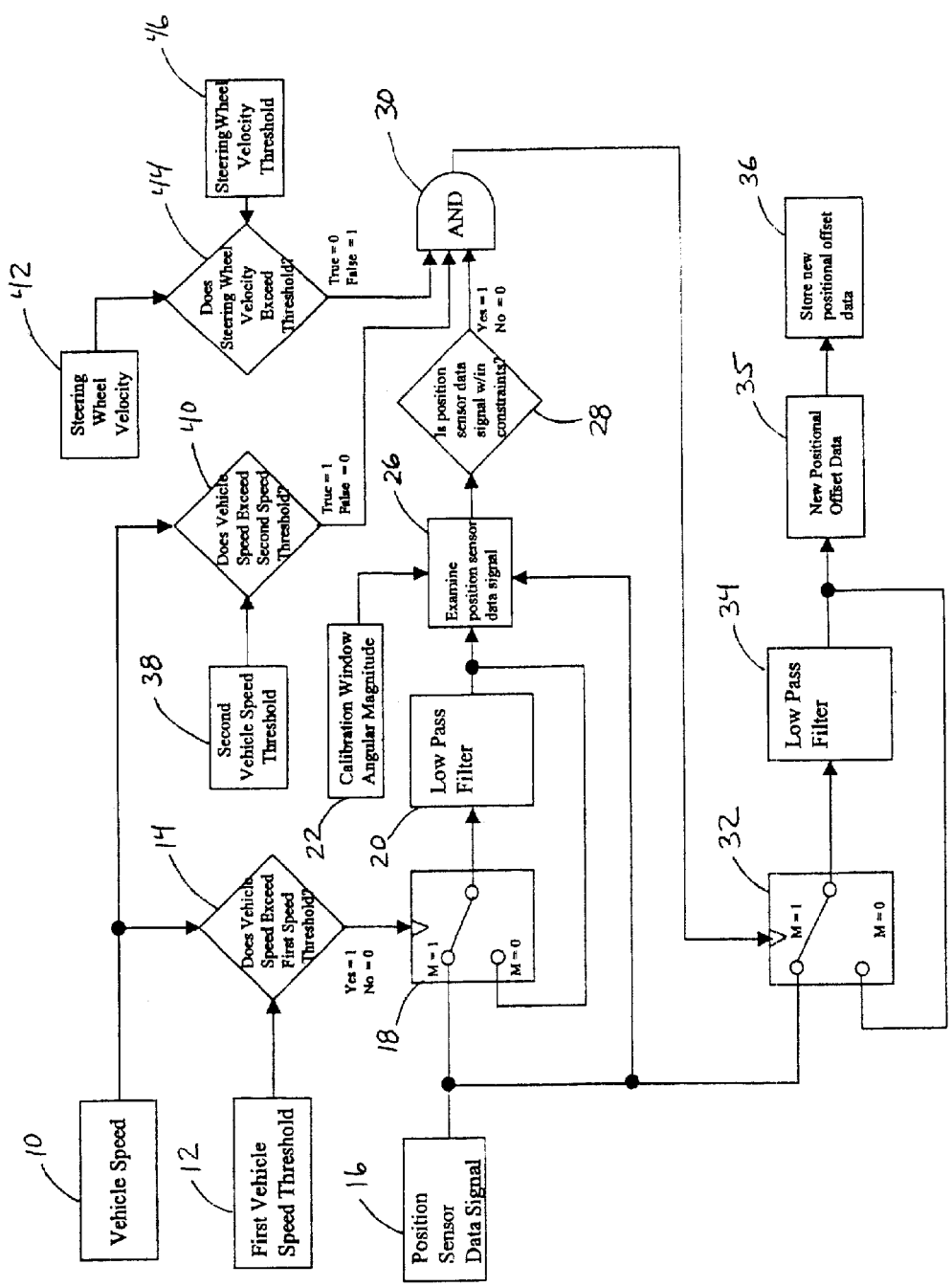
FIG. 2 illustrates a functional flow diagram describing a robust sensor offset learning algorithm in accordance with an embodiment of the invention.

Referring to FIG. 2, a functional flow diagram describing a robust sensor offset learning algorithm in accordance with an embodiment of the invention is illustrated and discussed. A vehicle speed signal 10 and a predetermined first vehicle speed threshold 12 are obtained. The vehicle speed signal 10 is then examined and compared at step 14 with the first vehicle speed threshold 12 so as to determine if the vehicle is traveling above the first vehicle speed threshold 12. In accordance with an embodiment of the invention, the first vehicle speed threshold 12 is a predefined value and may be of any value suitable to the desired end purpose. Also upon a vehicle ignition cycle initiation, a position sensor data signal 16 is obtained. Preferably, position sensor data signal 16 is further responsive to current position sensor values from at least one position sensor, a factory stored position offset and a previously stored positional offset data signal.

In accordance with an embodiment of the invention, the factory stored position offset is an offset value representing the inherent systemic position sensor offset. In addition, the previously stored positional offset data signal is the positional offset data signal updated during the previous ignition cycle to reflect the new positional offset data signal.

If it is determined that the vehicle speed 10 does exceed the first vehicle speed threshold 12 the position sensor data signal 16 will be communicated with a first low pass filter 20 via a switch 18 so as to begin formulating a calibration window center value needed to construct a desired calibration window. The calibration window is defined as a predetermined calibration window angular range 22 about a calibration window center value, wherein the calibration window center value is responsive to the position sensor data signal 16. Once the calibration window center value is formulated the predetermined calibration window angular range 22 is obtained and the calibration window is determined. In accordance with an embodiment of the invention, position sensor data signal 16 may be communicated with first low pass filter 20 via any means known in the art and suitable to the desired end purpose.

To formulate the calibration window center value, the position sensor data signal 16 is applied to the first low pass filter 20 which filters the position sensor data signal 16 slowly so as to track the steering wheel activity of the vehicle. Essentially an average value representing the positional sensor data signal 16 will slowly be determined. This average value is the calibration window center value about which the calibration window will be centered. The calibration window center value represents the location where the steering wheel spends the most time while the vehicle is traveling above the first vehicle speed threshold 12.

It should be noted that if the vehicle speed 10 fails to exceed the first vehicle speed threshold 12 the input to the first low pass filter 20 will be held constant at its previously valid state through switch 18. This allows the algorithm to retain current information regarding vehicle conditions without having to relearn this information.

The position sensor data signal 16 will then be examined at step 26 so as to determine if the position sensor data signal 16 values fit within the determined calibration window and thus satisfies the calibration window constraints at step 28. As an example, if the calibration window angular range is predetermined to be +/- five degrees and the calibration window center value is determined to be ten degrees from a 0 degree angular position, then the calibration window is defined to be between five degrees and fifteen degrees. Any position sensor data signal 16 values which fall within this range will satisfy the calibration window constraints at step 28. In accordance with the present invention, the predefined calibration window angular range 22 is preferably +five degrees and −five degrees from the calibration window center value, or ten degrees total. However, it is considered within the scope of the invention that predefined calibration window angular range 22 may be any value suitable to the desired end purpose. The result of comparing the position sensor data signal 16 to the calibration window constraints is communicated to the enable logic 30.

In accordance with an embodiment of the invention, a predetermined second vehicle speed threshold 38 is obtained and the vehicle speed signal 10 is compared with the second vehicle speed threshold 38 at step 40 so as to determine if the vehicle is traveling above a second desired threshold value. In addition, a steering wheel angular velocity 42 and a predetermined steering wheel angular velocity threshold 46 are obtained and compared together at step 44 so as to determine if the steering wheel activity is below a desired amount. This allows the algorithm to identify sensor values that accurately reflect vehicle conditions by identifying a straight ahead driving condition. In accordance with an embodiment of the invention, steering wheel angular velocity 42 may be obtained using any method known in the art and suitable to the desired end purpose.

When the position sensor data signal 16 satisfies the calibration window constraints at step 28, the vehicle is traveling above the second vehicle speed threshold 38 and the steering wheel velocity 42 is below the steering wheel velocity threshold 46, the algorithm initial conditions are determined to be satisfied by enable logic 30 and the remainder of the algorithm is enabled thus allowing the algorithm to begin gathering data for future use.

Once all initial conditions are met, the enable logic 30 activates switch 32 to provide position sensor data signal 16 to a second low pass filter 34. The position sensor data signal 16 is then slowly filtered by the second low pass filter 34 so as to create a new positional offset data signal 35. This new positional offset data signal 35 is responsive to past and current vehicle conditions and is thus considered to have learned from past vehicle conditions. It should be noted that, if at any time the algorithm initial conditions fail to be satisfied, the input to the second low pass filter 34 will be held constant at its previously valid state through switch 32. This allows the algorithm to retain the new positional offset data signal 35 value already obtained, thus avoiding having to relearn a new positional offset data 35 every time initial conditions are not satisfied.

Once the ignition cycle is terminated, the new positional offset data signal 35 is then combined with the previously stored positional sensor offset data signal and stored at step 36 so as to replace the previously stored positional offset data signal. Thus upon the next ignition cycle, the new positional offset data signal 35 will be factored into the position sensor data signal 16 as the previously stored positional offset data signal, thus allowing the position sensor to be automatically updated upon each ignition cycle. In accordance with an embodiment of the invention, the new positional offset data signal 35 may be combined with the previously stored positional sensor offset data signal in a predetermined incremental step so as to limit the effect of the new positional offset data signal 35 to a predetermined step size. For example, if a new positional offset data signal 35 identifies a four degree offset and the predetermined incremental step is two degrees for a single ignition cycle, then only two degrees will be added to the previously stored positional offset data signal for a single ignition cycle. This effectively slows the algorithm by making it a function of multiple ignition cycles, thus reducing algorithm susceptibility to various conditions, such as cross winds, crowned roads and circular tracks.

In accordance with an embodiment of the invention, it is considered with the scope of the invention that the new positional offset data signal 35 may be applied to the position sensor data signal 16 via active feedback. This would allow the robust sensor offset learning algorithm to be dynamically and constantly updated with the new positional offset data 35. This would effectively allow position sensor data signal 16 to be continually and dynamically responsive to new positional offset data signal 35.

In accordance with an embodiment of the invention, it is also considered to be within the scope of the invention that although enable logic 30 is shown to be responsive to a second vehicle speed threshold 38 and a steering wheel velocity threshold 46, enable logic 30 may be responsive to any known or estimated vehicle signal or condition suitable to the desired end purpose, such as vehicle yaw rate, vehicle wheel speed or vehicle lateral acceleration.

In accordance with an embodiment of the invention, it is also considered to be within the scope of the invention that position sensor data signal 16 and enable logic 30 may be further responsive to any condition suitable to the desired end purpose such as road conditions and atmospheric conditions.

In accordance with an embodiment of the invention the first low pass filter 20 and the second low pass filter 34 are preferably 0.15 mHz filters. However, any filtering frequency, or combination thereof suitable to the desired end purpose may be used. In addition, any filtering circuit or method suitable to the desired end purpose may be used, such as hardware or software.

In accordance with an embodiment of the invention, the position sensor data signal 16 is preferably generated external to the robust sensor offset learning algorithm.

In accordance with an embodiment of the invention, new positional offset data signal 35 may be stored via any suitable storage method known in the art and suitable to the desired end purpose, such as electronically erasable programmable read only memory (EEPROM).

In addition, it is considered within the scope of the present invention, that several new positional offset data signals 35 obtained over multiple ignition cycles may be stored and applied to the robust sensor learning algorithm, either singly, collectively or any combination thereof. Also, these several new positional offset data signals 35 may be stored via any suitable storage method known in the art and suitable to the desired end purpose, such as electronically erasable programmable read only memory (EEPROM).

Furthermore, it is considered within the scope of the present invention that some or all of the initial conditions may be generated external to the algorithm and communicated to the algorithm as an enable signal.

Processing of FIG. 2 may be implemented through a controller operating in response to a computer program. In order to perform the prescribed functions and desired processing, as well as the computations therefore (e.g., the execution of voltage mode motor control algorithm(s), the control processes prescribed herein, and the like), the controller may include, but not be limited to, a processor(s), computer(s), memory, storage, register(s), timing, interrupt (s), communication interfaces, and input/output signal interfaces, as well as combinations comprising at least one of the foregoing. For example, the controller may include signal input signal filtering to enable accurate sampling and conversion or acquisitions of such signals from communications interfaces.

The disclosed invention can be embodied in the form of a computer or controller implemented processes. The present invention can also be embodied in the form of computer program code containing instructions embodied in tangible media, such as floppy diskettes, CD-ROMs, hard drives, or any other computer-readable medium, wherein when the computer program code is loaded into and executed by a computer or controller, the computer or controller becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for updating a sensor offset using a robust sensor learning algorithm comprising:
    obtaining vehicle data signals;
    obtaining a position sensor data signal, said position sensor data signal being responsive to a stored positional offset data signal;
    determining whether algorithm initial conditions are satisfied;
    formulating a new positional offset data signal conditioned on satisfaction of said initial conditions; and
    storing said new positional offset data signal so as to combine said new positional offset data signal with said stored positional offset data signal and replace said stored positional offset data signal.

2. The method of claim 1, wherein said vehicle data signals include a vehicle speed signal.

3. The method of claim 1, wherein said vehicle data signals further include a wheel speed signal, a vehicle yaw rate signal and a vehicle lateral acceleration signal.

4. The method of claim 1, wherein said position sensor data signal is further responsive to the angular position of a vehicle steering wheel.

5. The method of claim 1, wherein said position sensor data signal is further responsive to said new positional offset data signal.

6. The method of claim 1, wherein said new positional offset data signal is stored via an electronically erasable programmable read only memory (EEPROM).

7. The method of claim 1, wherein said determining whether algorithm initial conditions are satisfied includes comparing said vehicle data signals with predetermined vehicle threshold values so as to determine whether the magnitude of said vehicle data signals conform with said predetermined vehicle threshold values.

8. The method of claim 7, wherein said vehicle threshold values include a steering wheel angular velocity threshold, a first vehicle speed threshold and a second vehicle speed threshold.

9. The method of claim 1, wherein said determining whether algorithm initial conditions are satisfied includes creating a calibration window having a calibration window constraint.

10. The method of claim 9, wherein said calibration window constraint is responsive to said position sensor data signal and wherein said calibration window constraint includes a predefined calibration window angular range.

11. The method of claim 10, wherein said predefined calibration window angular range is ten degrees.

12. The method of claim 9, wherein said determining whether algorithm initial conditions are satisfied includes examining said position sensor data signal to determine if said position sensor data signal conforms to said calibration window constraint.

13. The method of claim 1, wherein said formulating a new positional offset data signal includes applying said position sensor data signal to a low pass filter so as to create said new positional offset data signal.

14. The method of claim 1, wherein said formulating a new positional offset data signal includes actively applying said new positional offset data signal to said position sensor data signal via active feedback logic.

15. The method of claim 1, wherein said storing said new positional offset data signal includes combining said new positional offset data signal with said stored positional offset data signal using a predetermined incremental step.

16. The method of claim 1, wherein said storing said new positional offset data signal includes storing said new positional offset data signal over multiple ignition cycles.

17. The method of claim 1, wherein said storing said new positional offset data signal includes storing said new positional offset data signal using an erasable writable non-volatile memory.

18. A medium encoded with a machine-readable computer program code for updating a sensor offset using a robust sensor offset learning algorithm, said medium including instructions for causing controller to implement a method comprising:

obtaining vehicle data signals;

obtaining a position sensor data signal, said position sensor data signal being responsive to a stored positional offset data signal;

determining whether algorithm initial conditions are satisfied;

formulating a new positional offset data signal conditioned on satisfaction of said initial conditions; and storing said new positional offset data signal so as to combine said new positional offset data signal with said stored positional offset data signal and replace said stored positional offset data signal.

19. The medium of claim 18, wherein said vehicle data signals include a vehicle speed signal.

20. The medium of claim 18, wherein said vehicle data signals further include a wheel speed signal, a vehicle yaw rate signal and a vehicle lateral acceleration signal.

21. The medium of claim 18, wherein said position sensor data signal is further responsive to the angular position of a vehicle steering wheel.

22. The medium of claim 18, wherein said position sensor data signal is further responsive to said new positional offset data signal.

23. The medium of claim 18, wherein said new positional offset data signal is stored via an electronically erasable programmable read only memory (EEPROM).

24. The medium of claim 18, wherein said determining whether algorithm initial conditions are satisfied includes comparing said vehicle data signals with predetermined vehicle threshold values so as to determine whether the magnitude of said vehicle data signals conform with said predetermined vehicle threshold values.

25. The medium of claim 24, wherein said vehicle threshold values include a steering wheel angular velocity threshold, a first vehicle speed threshold and a second vehicle speed threshold.

26. The medium of claim 18, wherein said determining whether algorithm initial conditions are satisfied includes creating a calibration window having a calibration window constraint.

27. The medium of claim 26, wherein said calibration window constraint is responsive to said position sensor data signal and wherein said calibration window constraint includes a predefined calibration window angular range.

28. The medium of claim 27, wherein said predefined calibration window angular range is ten degrees.

29. The medium of claim 26, wherein said determining whether algorithm initial conditions are satisfied includes examining said position sensor data signal so as to determine if said position sensor data signal conforms to said calibration window constraint.

30. The medium of claim 18, wherein said formulating a new positional offset data signal includes applying said position sensor data signal to a low pass filter so as to create said new positional offset data signal.

31. The medium of claim 18, wherein said formulating a new positional offset data signal includes actively applying said new positional offset data signal to said position sensor data signal via active feedback logic.

32. The medium of claim 18, wherein said storing said new positional offset data signal includes combining said new positional offset data signal with said stored positional offset data signal using a predetermined incremental step.

33. The medium of claim 18, wherein said storing said new positional offset data signal includes storing said new positional offset data signal over multiple ignition cycles.

34. The medium of claim 18, wherein said storing said new positional offset data signal includes storing said new positional offset data signal using an erasable writable non-volatile memory.

* * * * *